United States Patent
Yanai et al.

(10) Patent No.: US 10,585,342 B2
(45) Date of Patent: Mar. 10, 2020

(54) LIGHT SOURCE DEVICE AND PROJECTOR

(71) Applicant: SEIKO EPSON CORPORATION, Tokyo (JP)

(72) Inventors: Hiroaki Yanai, Azumino (JP); Ayumu Kobayashi, Matsumoto (JP); Makoto Fuse, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/364,516

(22) Filed: Mar. 26, 2019

(65) Prior Publication Data

US 2019/0302588 A1 Oct. 3, 2019

(30) Foreign Application Priority Data

Mar. 27, 2018 (JP) .................. 2018-059135

(51) Int. Cl.
  *G03B 21/20* (2006.01)
  *G02B 5/02* (2006.01)
  *G03B 21/00* (2006.01)
  *H04N 9/31* (2006.01)

(52) U.S. Cl.
  CPC ......... *G03B 21/204* (2013.01); *G02B 5/0284* (2013.01); *G03B 21/006* (2013.01); *G03B 21/208* (2013.01); *G03B 21/2066* (2013.01); *G03B 21/2073* (2013.01); *H04N 9/3161* (2013.01)

(58) Field of Classification Search
  CPC ............. G03B 21/208; G03B 21/2033; G02B 5/0284; G02B 5/0289; G02B 5/0278; G02B 5/021
  See application file for complete search history.

(56) References Cited

U.S. PATENT DOCUMENTS

| | | | |
|---|---|---|---|
| 2011/0116253 A1 | 5/2011 | Sugiyama | |
| 2012/0133904 A1 | 5/2012 | Akiyama | |
| 2015/0226389 A1 | 8/2015 | Kasugai et al. | |
| 2015/0301438 A1 | 10/2015 | Akiyama et al. | |
| 2016/0085084 A1* | 3/2016 | Masson | G02B 5/0284 |
| | | | 359/633 |

FOREIGN PATENT DOCUMENTS

| | | |
|---|---|---|
| JP | 2011-108502 A | 6/2011 |
| JP | 2012-118110 A | 6/2012 |
| JP | 2015-203857 A | 11/2015 |
| WO | 2014/073136 A1 | 5/2014 |

* cited by examiner

*Primary Examiner* — Ryan D Howard
(74) *Attorney, Agent, or Firm* — Oliff PLC (57) ABSTRACT

A light source device according to the invention includes a light source configured to emit blue light having a wavelength band of 37 nm or less and a diffusion element configured to diffuse the light emitted from the light source. The diffusion element includes a base material that has an uneven structure and is composed of a metal, a reflection film that is provided along the uneven structure and is composed of aluminum, and a dielectric multilayer film provided on the reflection film.

20 Claims, 5 Drawing Sheets

LIGHT SOURCE DEVICE AND PROJECTOR

BACKGROUND

1. Technical Field

The present invention relates to a light source device and a projector.

2. Related Art

As a light source device of a projector, a light source device including a solid light source such as a semiconductor laser is known. The light source device including a laser light source has advantages that the device can be downsized, the color reproducibility is excellent, instantaneous lighting is possible, the light source has a long service life, and the like. On the other hand, light emitted from the laser light source is coherent light, and has a disadvantage that a speckle noise or the like is likely to occur, and in order to suppress the speckle noise, it is necessary to diffuse light using an optical element such as a diffusion plate.

JP-A-2015-203857 (Patent Document 1) discloses a lighting device including a light source device, a polarization separation element on which light from the light source device is incident, a phosphor layer on which one light component separated by the polarization separation element is incident, and a diffuse reflection element on which the other light component is incident, and which has an uneven structure. Patent Document 1 discloses an example of a diffuse reflection element in which a reflection film composed of silver, aluminum, or the like is provided on a base material made of glass having an uneven structure, a diffuse reflection element composed of a base material made of silver or aluminum having an uneven structure, and the like, and describes that the peak wavelength of blue light incident on the diffuse reflection element is 460 nm.

WO 2014/073136 (Patent Document 2) discloses a light source including a semiconductor laser configured to emit blue light having a center wavelength of 430 nm to 500 nm, a fluorescence emitting portion, and a wavelength converting portion including a light transmission region and a polarization conversion reflection region. Patent Document 2 describes that the polarization conversion reflection region has a configuration in which protrusions and recesses are formed on the surface of a substrate composed of an aluminum alloy, and a silver film and a silicon oxide film are sequentially formed on the protrusions and recesses.

Patent Documents 1 and 2 describe that silver or aluminum is used as a reflection film for an element configured to diffuse and reflect blue light. The blue light is light on the short wavelength side in the visible light wavelength band, and has a relatively large action of accelerating a metal aggregation phenomenon or the like. In general, when comparing various physical property values between silver and aluminum, the aggregation energy of aluminum is larger than that of silver, however, the reflectance of aluminum is lower than that of silver. Therefore, there was a problem that the reflectance decreases in the case where aluminum is used as the material of the reflection film for suppressing aggregation of the reflection film that may occur when the temperature of the reflection film has increased by irradiation with light or the like.

SUMMARY

An advantage of some aspects of the invention is to provide a light source device capable of suppressing a decrease in the reflectance of a diffusion element while suppressing a decrease in the reliability of the diffusion element. Another advantage of some aspects of the invention is to provide a projector including the light source device.

A light source device according to an aspect of the invention includes a light source configured to emit blue light having a wavelength band of 37 nm or less and a diffusion element configured to diffuse the light emitted from the light source, wherein the diffusion element includes a base material that has an uneven structure and is composed of a metal, a reflection film that is provided along the uneven structure and is composed of aluminum, and a dielectric multilayer film provided on the reflection film.

In the light source device according to the aspect of the invention, the base material may be composed of an aluminum alloy, and the aluminum content of the reflection film may be higher than the aluminum content of the base material.

In the light source device according to the aspect of the invention, the dielectric multilayer film may be composed of two or more types of materials having mutually different refractive indices, and also may be constituted by a dielectric film having seven or more layers.

In the light source device according to the aspect of the invention, the reflection film may reflect the light at a reflection angle within a range of 0° to 70° based on a direction perpendicular to a tangent line to the surface of the reflection film at an incident position of the light.

In the light source device according to the aspect of the invention, the wavelength of the light source may be 447 nm or more and 484 nm or less.

The light source device according to the aspect of the invention may further include a rotating device configured to rotate the diffusion element.

A projector according to an aspect of the invention includes the light source device according to the aspect of the invention, a light modulator configured to modulate light emitted from the light source device in accordance with image information, and a projection optical device configured to project the light modulated by the light modulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

A projector of this embodiment is one example of a liquid crystal projector including a light source device using a semiconductor laser.

In the respective drawings hereinbelow, in order to make the respective constituent elements easy to see, the constituent elements are sometimes shown at different scales depending on the constituent elements.

A projector 1 according to this embodiment is a projection-type image display device configured to display a color video image (image) on a screen (projection target face) SCR. The projector 1 uses three light modulators corresponding to the light of respective colors: red light LR, green light LG, and blue light LB. The projector 1 uses a semiconductor laser (laser diode) capable of obtaining light with a high luminance and a high output as a light source.

Figure 1:
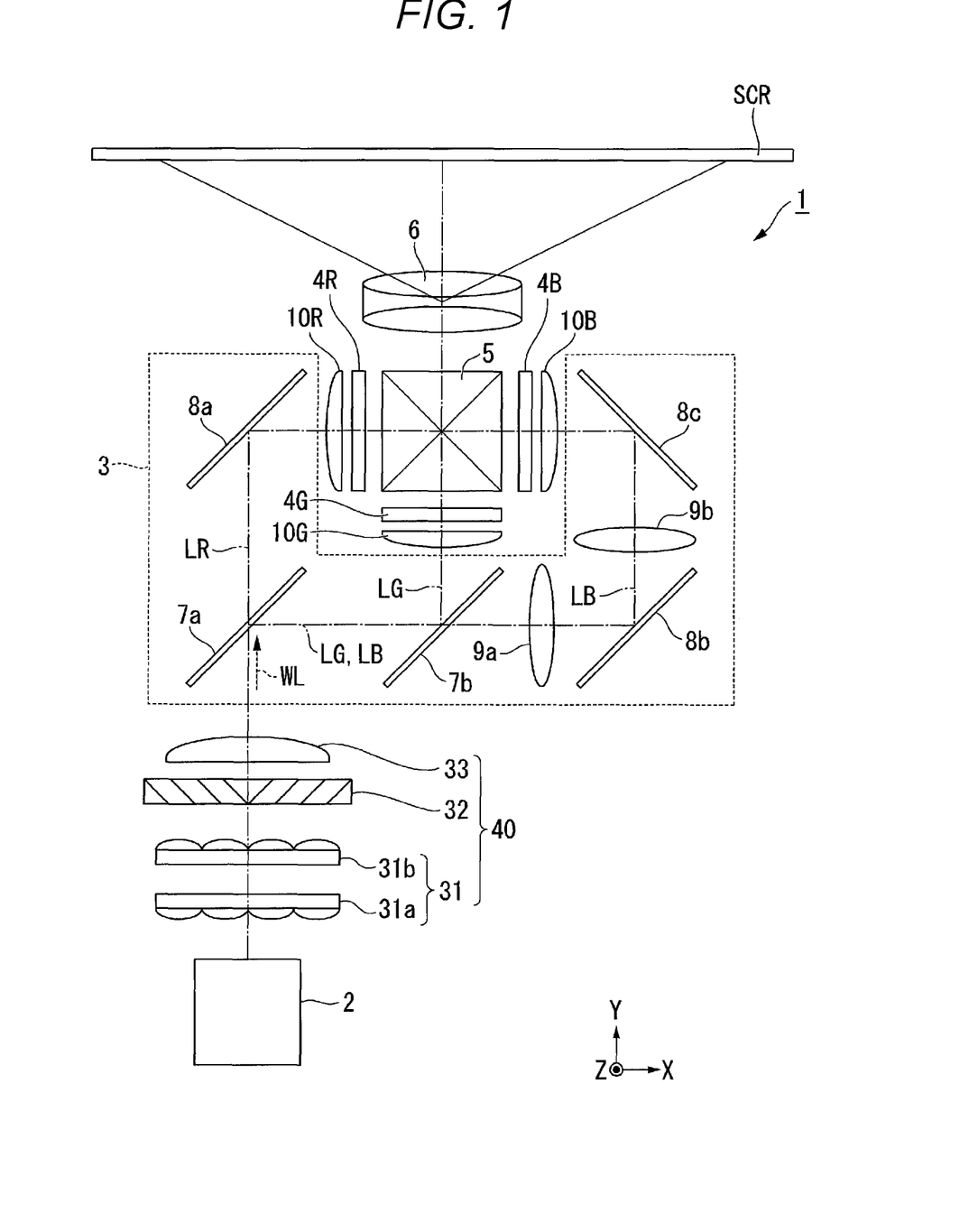
FIG. 1 is a schematic configuration diagram of a projector according to an embodiment of the invention.

As shown in FIG. 1, the projector 1 includes a light source device 2, a uniform illumination optical system 40, a color separation optical system 3, a light modulator 4R, alight modulator 4G, a light modulator 4B, a combining optical system 5, and a projection optical device 6.

The light source device 2 emits illumination light WL toward the uniform illumination optical system 40. A detailed configuration of the light source device 2 will be described later.

The uniform illumination optical system 40 includes an integrator optical system 31, a polarization conversion element 32, and a superimposing optical system 33. The uniform illumination optical system 40 makes the light intensity distribution of the illumination light WL emitted from the light source device 2 uniform in each of the light modulator 4R, the light modulator 4G, and the light modulator 4B that are regions to be illuminated. The illumination light WL emitted from the uniform illumination optical system 40 is incident on the color separation optical system 3.

The color separation optical system 3 separates the white illumination light WL into red light LR, green light LG, and blue light LB. The color separation optical system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has a function of separating the illumination light WL from the light source device 2 into the red light LR and the other light (the green light LG and the blue light LB). The first dichroic mirror 7a transmits the separated red light LR and reflects the other light (the green light LG and the blue light LB). On the other hand, the second dichroic mirror 7b has a function of separating the other light into the green light LG and the blue light LB. The second dichroic mirror 7b reflects the separated green light LG and transmits the blue light LB.

The first reflection mirror 8a is disposed in the optical path of the red light LR and reflects the red light LR transmitted through the first dichroic mirror 7a toward the light modulator 4R. On the other hand, the second reflection mirror 8b and the third reflection mirror 8c are disposed in the optical path of the blue light LB and reflect the blue light LB transmitted through the second dichroic mirror 7b toward the light modulator 4B. The green light LG is reflected by the second dichroic mirror 7b toward the light modulator 4G.

The first relay lens 9a and the second relay lens 9b are disposed on the light emission side of the second dichroic mirror 7b in the optical path of the blue light LB. The first relay lens 9a and the second relay lens 9b compensate for the loss of the blue light LB due to the fact that the optical path length of the blue light LB is longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

In each of the light modulator 4R, the light modulator 4G, and the light modulator 4B, for example, a transmission-type liquid crystal panel is used. Further, it is configured such that a pair of polarizing plates (not shown) is disposed on the light incident side and the light emission side of the liquid crystal panel so that only light linearly polarized in a specific direction is allowed to pass therethrough.

A field lens 10R, a field lens 10G, and a field lens 10B are disposed on the light incident side of the light modulator 4R, the light modulator 4G, and the light modulator 4B, respectively. The field lens 10R, the field lens 10G, and the field lens 10B collimate the red light LR, the green light LG, and the blue light LB to be incident on the light modulator 4R, the light modulator 4G, and the light modulator 4B, respectively.

The combining optical system 5 combines the image light corresponding to the red light LR, the green light LG, and the blue light LB by the incidence of the image light from the light modulator 4R, the light modulator 4G, and the light modulator 4B, and emits the combined image light toward the projection optical device 6. As the combining optical system 5, for example, a cross dichroic prism is used.

The projection optical device 6 is constituted by a plurality of projection lenses. The projection optical device 6 magnifies the image light combined by the combining optical system 5 and projects the magnified image light toward the screen SCR. In this manner, an image is displayed on the screen SCR.

Light Source Device

Hereinafter, the light source device 2 will be described.

Figure 2:
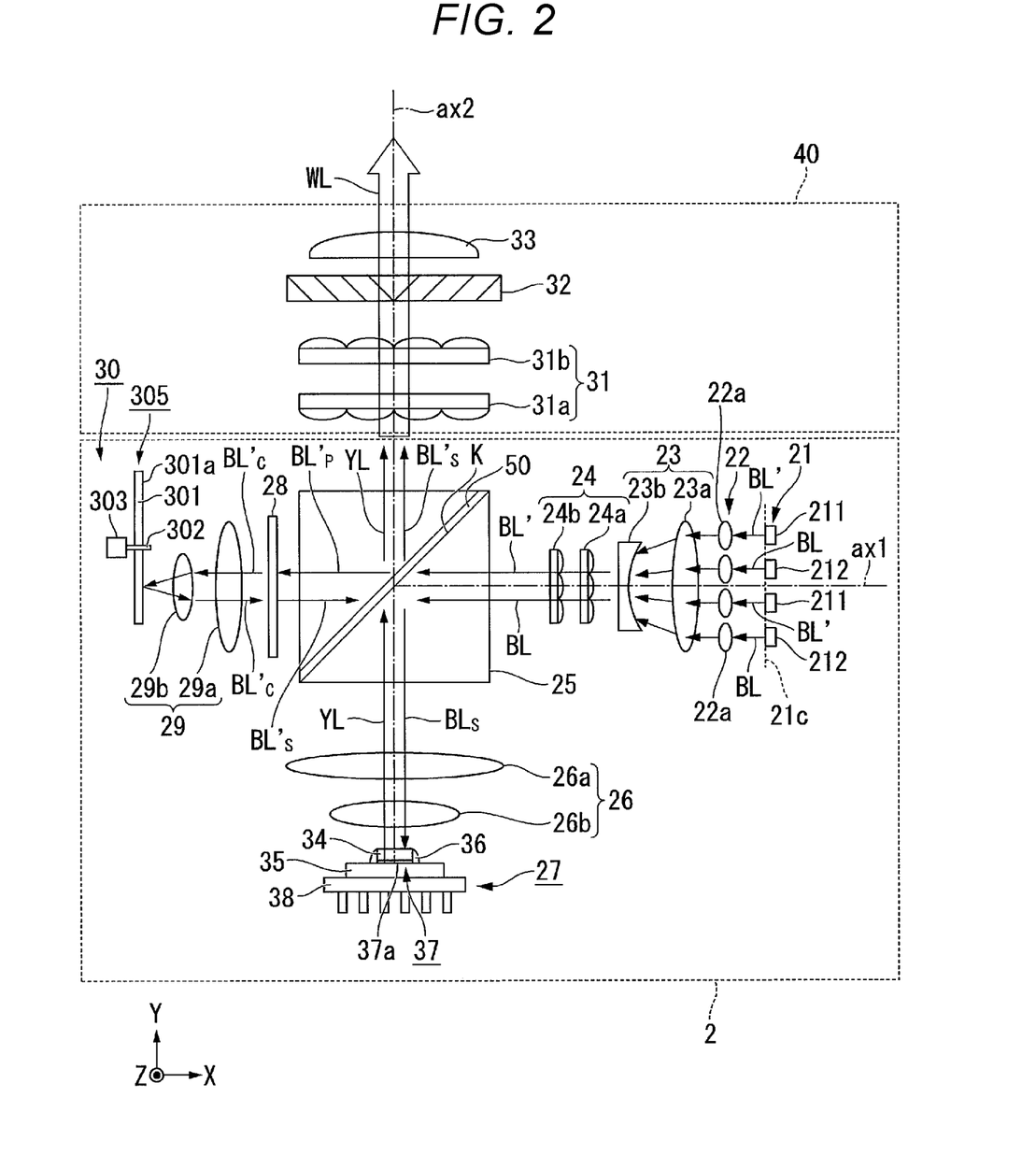
FIG. 2 is a schematic configuration diagram of a light source device.

FIG. 2 is a plan view showing a schematic configuration of the light source device 2.

As shown in FIG. 2, the light source device 2 roughly includes an array light source 21, a collimator optical system 22, an afocal optical system 23, a homogenizer optical system 24, an optical element 25 including a polarization separation element 50, a first pickup optical system 26, a fluorescence emitting element 27, a retardation plate 28, a second pickup optical system 29, and a diffusion device 30.

Among these constituent elements, the array light source 21, the collimator optical system 22, the afocal optical system 23, the homogenizer optical system 24, the optical element 25, the retardation plate 28, the second pickup optical system 29, and the diffusion device 30 are sequentially arranged side by side on an optical axis ax1 in a state where the optical center of each member is made to coincide with the optical axis ax1. On the other hand, the fluorescence emitting element 27, the first pickup optical system 26, and the optical element 25 are sequentially arranged side by side on an optical axis ax2 in a state where the optical center of each member is made to coincide with the optical axis ax2. The optical axis ax1 and the optical axis ax2 are present on the same plane and are in a positional relationship of being orthogonal to each other.

The array light source 21 includes a plurality of semiconductor lasers arranged in an array. The plurality of semiconductor lasers include first semiconductor lasers 211 and semiconductor lasers 212. The plurality of first semiconductor lasers 211 and the plurality of semiconductor lasers 212 are arranged side by side in an array in the same plane orthogonal to the optical axis ax1.

The first semiconductor laser 211 is a laser light source for illumination light configured to emit blue light BL'. The first semiconductor laser 211 emits light having a wavelength band of 450 nm or more and 480 nm or less as the blue light BL'. The peak wavelength of the blue light BL' is, for example, 460 nm. The second semiconductor laser 212 is a laser light source for excitation light configured to emit excitation light BL. The second semiconductor laser 212 emits laser light having a peak wavelength of, for example, 446 nm as the excitation light BL.

The first semiconductor laser 211 of this embodiment corresponds to a light source described in the appended claims.

The excitation light BL and the blue light BL' are emitted from the array light source 21 toward the polarization separation element 50.

The excitation light BL and the blue light BL' emitted from the array light source 21 are incident on the collimator optical system 22. The collimator optical system 22 converts the excitation light BL and the blue light BL' emitted from the array light source 21 into a parallel luminous flux. The collimator optical system 22 is constituted by, for example, a plurality of collimator lenses 22a arranged side by side in an array. The plurality of collimator lenses 22a are disposed corresponding to each of the plurality of first semiconductor lasers 211 and the plurality of second semiconductor lasers 212.

The excitation light BL and the blue light BL' converted into the parallel luminous flux by passing through the collimator optical system 22 are incident on the afocal optical system 23. The afocal optical system 23 adjusts the luminous flux diameters of the excitation light BL and the blue light BL'. The afocal optical system 23 is constituted by, for example, an afocal lens 23a and an afocal lens 23b.

The excitation light BL and the blue light BL' whose luminous flux diameters are adjusted by passing through the afocal optical system 23 are incident on the homogenizer optical system 24. The homogenizer optical system 24 converts the light intensity distribution of each of the excitation light BL and the blue light BL' into, for example, a substantially uniform light intensity distribution, so-called "top-hat distribution". The homogenizer optical system. 24 is constituted by, for example, a multi-lens array 24a and a multi-lens array 24b.

The excitation light BL and the blue light BL' whose light intensity distributions are converted into a uniform state by the homogenizer optical system. 24 are incident on the optical element 25. The optical element 25 is constituted by, for example, a dichroic prism having wavelength selectivity. The dichroic prism has an inclined plane K having an angle of 45° with respect to both the optical axis ax1 and the optical axis ax2. The optical element 25 is disposed so that the intersection of the optical axes ax1 and ax2 orthogonal to each other and the optical center of the inclined plane K coincide with each other. The optical element 25 is not limited to an optical element having a prism shape such as a dichroic prism, and a dichroic mirror having a parallel plate shape may be used.

On the inclined plane K, the polarization separation element 50 having polarization selectivity and wavelength selectivity is provided. The polarization separation element 50 has a polarization separation function of separating the excitation light BL and the blue light BL' into an s-polarized component (one polarized component) and a p-polarized component (the other polarized component) with respect to the polarization separation element 50. Specifically, the polarization separation element 50 reflects the s-polarized component of the excitation light BL and the s-polarized component of the blue light BL' and transmits the p-polarized component of the excitation light BL and the p-polarized component of the blue light BL'.

Further, the polarization separation element 50 has wavelength selectivity so as to transmit florescence YL having a different wavelength band from those of the excitation light BL and the blue light BL' irrespective of the polarization state of the fluorescence YL.

The excitation light BL and the blue light BL' are coherent linearly polarized light. Further, the polarization directions of the excitation light BL and the blue light BL' when they are incident on the polarization separation element 50 are different from each other.

Specifically, the polarization direction of the excitation light BL coincides with the polarization direction of the polarized component (for example, s-polarized component) to be reflected by the polarization separation element 50. On the other hand, the polarization direction of the blue light BL' coincides with the polarization direction of the polarized component (for example, p-polarized component) to be transmitted through the polarization separation element 50. In this manner, when the excitation light BL and the blue light BL' are incident on the polarization separation element 50, the polarization direction of the excitation light BL and the polarization direction of the blue light BL' are orthogonal to each other. In order to realize this configuration, the first semiconductor laser 211 and the second semiconductor laser 212 may be disposed so that the polarization direction when the blue light BL' is emitted from the first semiconductor laser 211 is orthogonal to the polarization direction when the excitation light BL is emitted from the second semiconductor laser 212.

The polarization direction of the excitation light BL incident on the polarization separation element 50 coincides with the polarization direction of the s-polarized component, and therefore, the excitation light BL is reflected toward the fluorescence emitting element 27 as s-polarized excitation light BLs. On the other hand, the polarization direction of the blue light BL' incident on the polarization separation element 50 coincides with the polarization direction of the p-polarized component, and therefore, the blue light BL' is transmitted through the polarization separation element 50 toward the diffusion device 30 as p-polarized blue light BLp'.

The s-polarized excitation light BLs emitted from the polarization separation element 50 is incident on the first pickup optical system 26. The first pickup optical system 26 converges the excitation light BLs toward a phosphor layer 34 of the fluorescence emitting element 27. The first pickup optical system 26 is constituted by, for example, a pickup lens 26a and a pickup lens 26b.

The excitation light BLs emitted from the first pickup optical system 26 is incident on the fluorescence emitting element 27. The fluorescence emitting element 27 includes the phosphor layer 34, a substrate 35 that supports the phosphor layer 34, and a fixing member 36 that fixes the phosphor layer 34 to the substrate 35.

The phosphor layer 34 is supported by the substrate 35 with the fixing member 36 provided between the side face of the phosphor layer 34 and the substrate 35 in a state where a face on the opposite side to the side on which the excitation light BLs is incident of the phosphor layer 34 is in contact with the substrate 35.

The phosphor layer 34 contains a phosphor that is excited by absorbing the excitation light BLs with a wavelength of 446 nm. The phosphor excited by the excitation light BLs produces, for example, fluorescence (yellow light) YL having a peak wavelength in a wavelength band of 500 to 700 nm. As one example of the phosphor, an yttrium aluminum garnet (YAG)-based phosphor containing cerium as an activating agent is used.

As the phosphor layer 34, a phosphor layer having excellent heat resistance and excellent surface processability is preferably used. As such a phosphor layer 34, for example, a phosphor layer obtained by dispersing phosphor particles in an inorganic binder such as alumina, a phosphor layer obtained by sintering phosphor particles without using a binder, or the like can be preferably used.

A reflection portion 37 is provided on the opposite side to the side on which the excitation light BLs is incident of the phosphor layer 34. The reflection portion 37 has a function of reflecting part of the fluorescence YL produced in the phosphor layer 34. The reflection portion 37 is preferably composed of a specularly reflecting plane. In the fluorescence emitting element 27, by specularly reflecting the fluorescence YL produced in the phosphor layer 34 from the reflection portion 37, the fluorescence YL can be efficiently emitted from the phosphor layer 34.

Specifically, the reflection portion 37 has a configuration in which a reflection film 37a is provided on a face on the opposite side to the side on which the excitation light BLs is incident of the phosphor layer 34. The reflection portion 37 may have a configuration in which the substrate 35 is composed of a base material having a light reflection characteristic. In this case, by omitting the reflection film 37a and mirror-finishing a face opposed to the phosphor layer 34 of the substrate 35, this face can be made a specularly reflecting face.

As the fixing member 36, an inorganic adhesive having a light reflection characteristic is preferably used. In this case, light leaking from the side face of the phosphor layer 34 can be reflected to the inside of the phosphor layer 34 by the inorganic adhesive having a light reflection characteristic. According to this, the extraction efficiency of the fluorescence YL produced in the phosphor layer 34 can be further enhanced.

On the face on the opposite side to the face on which the phosphor layer 34 is supported of the substrate 35, a heat sink 38 is provided. In the fluorescence emitting element 27, heat can be released through the heat sink 38, and therefore, deterioration of the phosphor layer 34 due to heat can be suppressed.

Part of the fluorescence YL produced in the phosphor layer 34 is reflected by the reflection portion 37 and emitted outside the phosphor layer 34. The other part of the fluorescence YL produced in the phosphor layer 34 is emitted outside the phosphor layer 34 without passing through the reflection portion 37. In this manner, the fluorescence YL is emitted from the phosphor layer 34.

The fluorescence YL emitted from the phosphor layer 34 is a non-polarized light whose polarization direction is not aligned, and therefore is incident on the polarization separation element 50 while keeping the non-polarized state after passing through the first pickup optical system 26. The fluorescence YL is transmitted through the polarization separation element 50 toward the integrator optical system 31.

The p-polarized blue light BLp' emitted from the polarization separation element 50 is incident on the retardation plate 28. The retardation plate 28 is constituted by a ¼-wave plate (λ/4 plate) disposed in an optical path between the polarization separation element 50 and the diffusion device 30. Therefore, the p-polarized blue light BLp' emitted from the polarization separation element 50 is converted into a circularly polarized blue light BLc by being transmitted through the retardation plate 28, and thereafter is incident on the second pickup optical system 29.

The second pickup optical system 29 converges the blue light BLc' toward the diffusion device 30. The second pickup optical system 29 is constituted by, for example, a pickup lens 29a and a pickup lens 29b.

The diffusion device 30 diffusely reflects the blue light BLc' emitted from the second pickup optical system 29 toward the polarization separation element 50 again. As the diffusion device 30, a device causing Lambertian reflection of the blue light BLc' incident on the diffusion device 30 is preferably used. An effective light angle limited by the angle of the incident blue light BLc' and the entrance angle of the diffusely reflected light depends on the optical system up to the second pickup optical system 29 and the distance between the second pickup optical system 29 and the diffusion device 30. Therefore, as the practical reflection characteristic of the diffusion device 30, 70° or less is dominant.

The diffusion device 30 includes a diffusion plate 305 having a first face 305a and a motor 303 (rotating device) configured to rotate the diffusion plate 305 around a rotation shaft 302. The rotation shaft 302 is disposed substantially parallel to the optical axis ax1. According to this, the diffusion plate 305 rotates in a plane parallel to the first face 305a. The diffusion plate 305 is formed in, for example, a circular shape when seen from the direction of the rotation shaft 302. The diffusion plate 305 corresponds to the diffusion element described in the appended claims.

In the light source device 2, by using such a diffusion device 30, the blue light BLc' is diffusely reflected, so that the blue light BLc' having a substantially uniform illuminance distribution can be obtained. A detailed configuration of the diffusion plate 305 will be described later.

The blue light BLc' diffusely reflected by the diffusion device 30 passes through the second pickup optical system 29 again and is incident on the retardation plate 28. In this manner, the blue light BLc' is converted into s-polarized blue light BLs' and is incident on the polarization separation element 50. As described above, the blue light BLc' before it is incident on the diffusion device 30 is a circularly polarized light. If the polarized state of the blue light BLc' is not at all disturbed by the diffusion device 30, the blue light BLs' is completely s-polarized light and does not contain a p-polarized component. Even if the polarized state of the blue light BLc' is disturbed to some extent by the diffusion device 30, the main component of the blue light BLs' is an s-polarized component. The s-polarized component of the blue light BLs' is reflected by the polarization separation element 50.

In this manner, the blue light BLs' is emitted from the light source device 2 as the illumination light WL along with the fluorescence YL transmitted through the polarization separation element 50. That is, the blue light BLs' and the fluorescence YL are mutually emitted from the polarization separation element 50 toward the same direction. In this manner, the illumination light (white light) WL in which the blue light BLs' and the fluorescence (yellow light) YL are combined is obtained.

The illumination light WL emitted from the light source device 2 is incident on the integrator optical system 31. The integrator optical system 31 makes the luminance distribution of the incident illumination light WL uniform. The integrator optical system 31 is constituted by, for example, a lens array 31a and a lens array 31b. Each of the lens array 31a and the lens array 31b has a configuration in which a plurality of microlenses are arranged in an array.

The illumination light WL having passed through the integrator optical system 31 is incident on the polarization conversion element 32. The polarization conversion element 32 aligns the polarization direction of the incident illumination light WL. The polarization conversion element 32 is constituted by, for example, a polarization separation film and a retardation plate. The polarization conversion element 32 aligns the polarization direction of the fluorescence YL whose polarization direction is not aligned and the polarization direction of the s-polarized blue light BLs', and therefore converts one polarized component into the other polarized component (for example, the p-polarized component into the s-polarized component).

The illumination light WL having passed through the polarization conversion element 32 is incident on the superimposing optical system 33. The superimposing optical system 33 superimposes the illumination light WL emitted from the polarization conversion element 32. The superimposing optical system 33 is constituted by, for example, a superimposing lens. The illuminance distribution in a region to be illuminated is made uniform by the integrator optical system 31 and the superimposing optical system 33.

Figure 3:
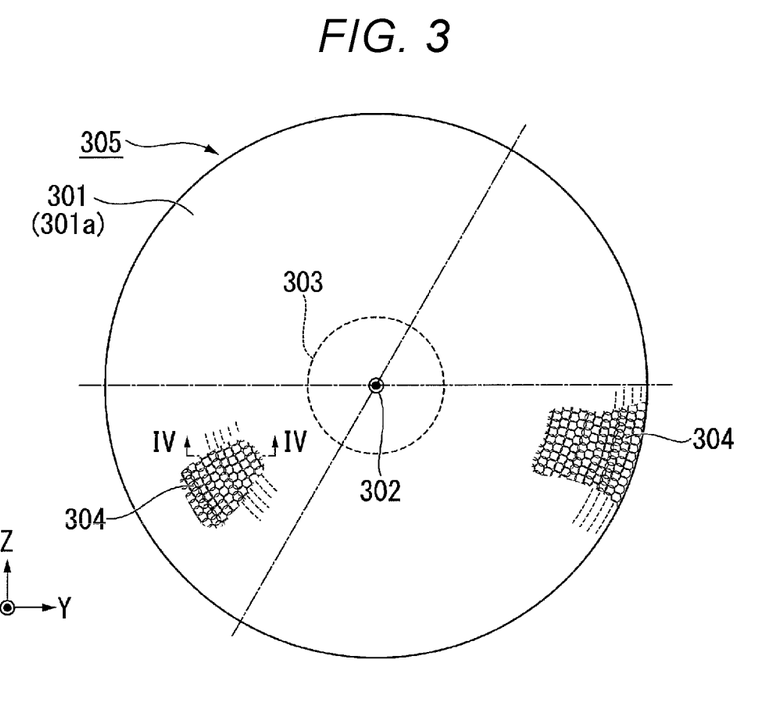
FIG. 3 is a front view of a diffusion plate.
Figure 4:
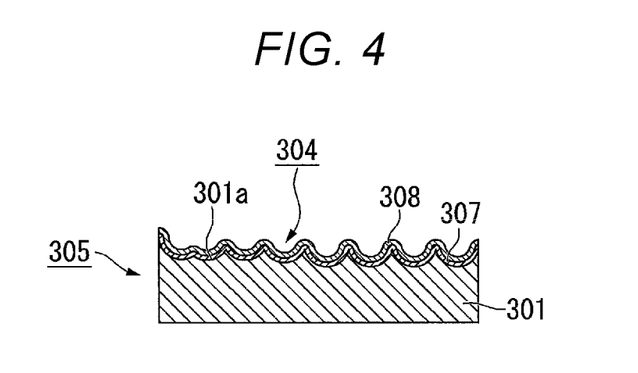
FIG. 4 is a cross-sectional view of the diffusion plate taken along the line IV-IV of FIG. 3.

FIG. 3 is a front view of the diffusion plate 305. FIG. 4 is a cross-sectional view of the diffusion plate 305 taken along the line IV-IV of FIG. 3.

As shown in FIG. 4, the diffusion plate 305 includes a base material 301, a reflection film 307, and a dielectric multilayer film 308.

The base material 301 is constituted by an aluminum alloy. As the aluminum alloy, for example, an Al—Mg—Si-based alloy obtained by adding magnesium (Mg) and silicon (Si) to aluminum (Al) is used. Other than this, the aluminum alloy may contain an element such as iron (Fe), copper (Cu), manganese (Mg), chromium (Cr), zinc (Zn), or titanium (Ti).

An uneven structure 304 composed of a plurality of recess portions is provided on a first face 301a on which the blue light BLc' is incident of the two faces of the base material 301. The uneven structure 304 includes a plurality of curved faces randomly arranged. That is, the base material 301 has the uneven structure 304. Each recess portion is formed into a substantially spherical shape. The depth of the recess portion is, for example, about ¼ the diameter of the entire spherical face. The uneven structure 304 can be formed by shaving the base material 301 through an etching process or the like or plastically deforming the base material 301 through a blasting process or the like.

As the aluminum alloy, for example, a 1000-series aluminum alloy wrought material such as A1050, A1070, or A1085 (JIS alloy number) may be used. An alloy material of this kind has excellent processability, and therefore, the contour formation by pressing, cutting, or the like or the formation of the surface shape by plastic deformation can be easily performed. Further, a 6000-series aluminum alloy wrought material such as A6061 or A6063 (JIS alloy number) may be used. An alloy material of this kind has an excellent strength and even if surface cutting or plastically deforming processing is performed, a microcrack or the like that causes rupture or the like of the reflection film is hardly generated. Another aluminum alloy wrought material or an aluminum alloy for die casting or casting can be appropriately selected depending on the performance or a processing method.

The reflection film 307 is provided along the uneven structure 304 of the base material 301. The reflection film 307 is constituted by a material containing aluminum. Specifically, the reflection film 307 is constituted by high purity aluminum having an aluminum content of 99.99 wt % or more. Preferably, for the reflection film 307, superhigh purity aluminum having an aluminum content of 99.999 wt % or more can be selected. Although a detailed description will be given later, the reflection film reflects light at a reflection angle within a range of 0° to 70° based on a direction perpendicular to a tangent line to the reflection film at an incident position of the light.

The reflection film 307 is obtained by forming a pure aluminum film having a predetermined film thickness and a smooth surface using a film forming method such as a sputtering method or a vapor deposition method on the first face 301a of the base material 301. In the film forming step, in the case where a sputtering target having an aluminum content of, for example, 99.999 wt % is used, the reflection film 307 composed of superhigh purity aluminum having an aluminum content of 99.999 wt % is obtained.

The dielectric multilayer film 308 is provided on a face on the opposite side to the base material 301 of the reflection film 307. Although illustration is omitted in FIG. 4, the dielectric multilayer film 308 has a configuration in which a plurality of two types of dielectric films having mutually different refractive indices are alternately stacked.

Figure 5:
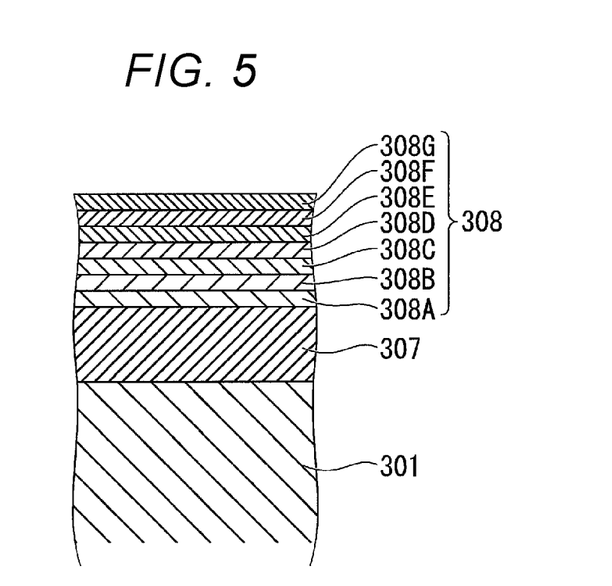
FIG. 5 is an enlarged cross-sectional view of a dielectric multilayer film.

FIG. 5 is an enlarged cross-sectional view of the dielectric multilayer film 308.

As shown in FIG. 5, the dielectric multilayer film 308 includes a first layer 308A, a second layer 308B, a third layer 308C, a fourth layer 308D, a fifth layer 308E, a sixth layer 308F, and a seventh layer 308G. The first layer 308A is provided on the reflection film 307 and contains silicon dioxide ($SiO_2$). The second layer 308B is provided on the first layer 308A and contains titanium dioxide ($TiO_2$). The third layer 308C is provided on the second layer 308B and contains silicon dioxide ($SiO_2$). The fourth layer 308D is provided on the third layer 308C and contains titanium dioxide ($TiO_2$). The fifth layer 308E is provided on the fourth layer 308D and contains silicon dioxide ($SiO_2$). The sixth layer 308F is provided on the fifth layer 308E and contains titanium dioxide ($TiO_2$). The seventh layer 308G is provided on the sixth layer 308F and contains silicon dioxide ($SiO_2$).

The dielectric multilayer film can improve the optical characteristic as the number of layers is larger. In this embodiment, as shown in FIG. 5, by using the dielectric multilayer film 308 constituted by seven layers on the reflection film 307 composed of an aluminum reflection film, a necessary reflection characteristic is obtained. In order to obtain the above-mentioned reflection characteristic shown in this embodiment, it is desired to use a dielectric multilayer film having seven or more layers. The number of layers of the dielectric multilayer film is not limited to seven, and it is also possible to select six or less layers depending on a desired reflection angle range, and the number of layers can be appropriately changed. In addition, the dielectric multilayer film can also be constituted by three or more types of dielectric films. Further, as the dielectric material, other than $SiO_2$ and $TiO_2$, $Nb_2O_5$, $Al_2O_3$, or the like may be used. That is, the dielectric multilayer film may be constituted by a dielectric film having seven or more layers composed of two or more types of materials having mutually different diffraction indices.

Examples

The present inventors actually experimentally prepared samples of a diffusion plate of Example and a diffusion plate of Comparative Example, and with respect to these samples, the reflectance and the reliability were evaluated.

Hereinafter, evaluation results will be described.

A6063 (JIS alloy number, Si: 0.2 to 0.6 wt %, Fe: 0.10 wt %, Cu: 0.35 wt %, Mn: 0.10 wt %, Mg: 0.45 to 0.9 wt %, Cr: 0.10 wt %, Zn: 0.10 wt %, Ti: 0.10 wt %, remainder: Al (98.5 wt % or less)) that is a type of Al—Mg—Si-based alloy was used as a base material, an uneven structure was formed on the surface of the base material, and a reflection film composed of pure Al and a dielectric multilayer film composed of $SiO_2$ and $TiO_2$ were sequentially formed on the uneven structure, whereby the diffusion plate of Example was prepared. The configurations of the reflection film and the dielectric multilayer film were the same as the configurations shown in FIG. 5.

The materials and the film thicknesses of the reflection film and the dielectric multilayer film used for the diffusion plate of Example are shown in Table 1.

TABLE 1

|  | Material | Film thickness (nm) |
|---|---|---|
| Seventh layer | $SiO_2$ | 5.0 |
| Sixth layer | $TiO_2$ | 42.0 |
| Fifth layer | $SiO_2$ | 87.0 |
| Fourth layer | $TiO_2$ | 45.0 |
| Third layer | $SiO_2$ | 85.0 |
| Second layer | $TiO_2$ | 46.0 |
| First layer | $SiO_2$ | 69.0 |
| Reflection film | Al | 100 |

An uneven structure was formed on the surface of a base material composed of the same Al—Mg—Si-based alloy as the diffusion plate of Example, and a foundation film composed of $Al_2O_3$, a foundation film composed of Ni, a reflection film composed of Ag, and a dielectric multilayer film composed of $Al_2O_3$, $SiO_2$, and $TiO_2$ were sequentially formed on the uneven structure, whereby the diffusion plate of Comparative Example was prepared.

The materials and the film thicknesses of the foundation films, the reflection film, and the dielectric multilayer film used for the diffusion plate of Comparative Example are shown in Table 2.

TABLE 2

|  | Material | Film thickness (nm) |
|---|---|---|
| Fifth layer | $SiO_2$ | 5.0 |
| Fourth layer | $TiO_2$ | 43.0 |
| Third layer | $SiO_2$ | 84.0 |
| Second layer | $TiO_2$ | 52.0 |
| First layer | $Al_2O_3$ | 25.0 |
| Reflection film | Ag | 210.0 |
| Foundation film | Ni | 40.0 |
| Foundation film | $Al_2O_3$ | 40.0 |

Evaluation of Reflectance

The present inventors performed theoretical calculation of the reflectance of each of the diffusion plate of Example and the diffusion plate of Comparative Example. The theoretical calculation method for an optical characteristic such as a reflectance of an optical thin film constituted by a dielectric multilayer film has been established, and is generally used when comparing the characteristic.

The reflectance changes depending on the wavelength and the reflection angle of light. Therefore, in the measurement of the reflectance, the reflectance was calculated for every nanometer of the wavelength when changing the wavelength of the light within a range of 430 to 650 nm and for every 10 degrees of the reflection angle when changing the incident angle. Further, it was confirmed that the reflectance according to simulation was obtained by preparing a trial product and measuring representative points.

Figure 6:
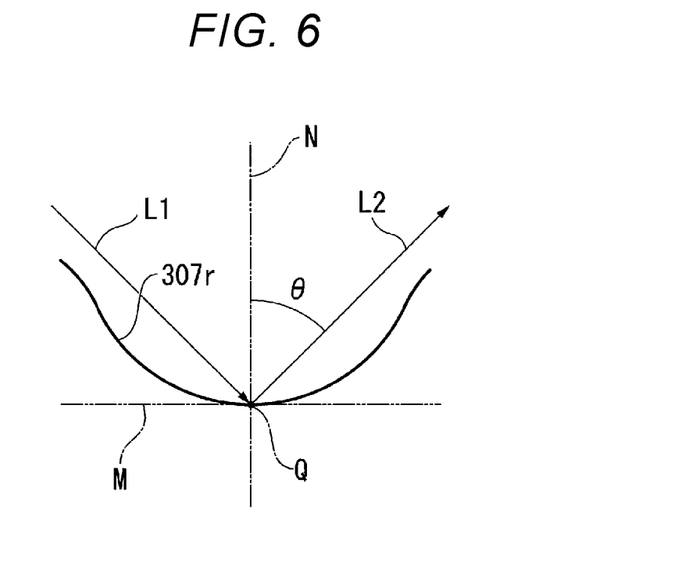
FIG. 6 is a view for illustrating a reflection angle of light that is an evaluation item.

FIG. 6 is a view for illustrating the reflection angle of light that is an evaluation item.

As shown in FIG. 6, a reflection angle θ in the evaluation is defined as an angle formed by a direction N perpendicular to a tangent line M to a reflection face 307r (the surface of the reflection film) at an incident position Q of an incident light L1 on the reflection face 307r and the traveling direction of a reflected light L2.

Figure 7:
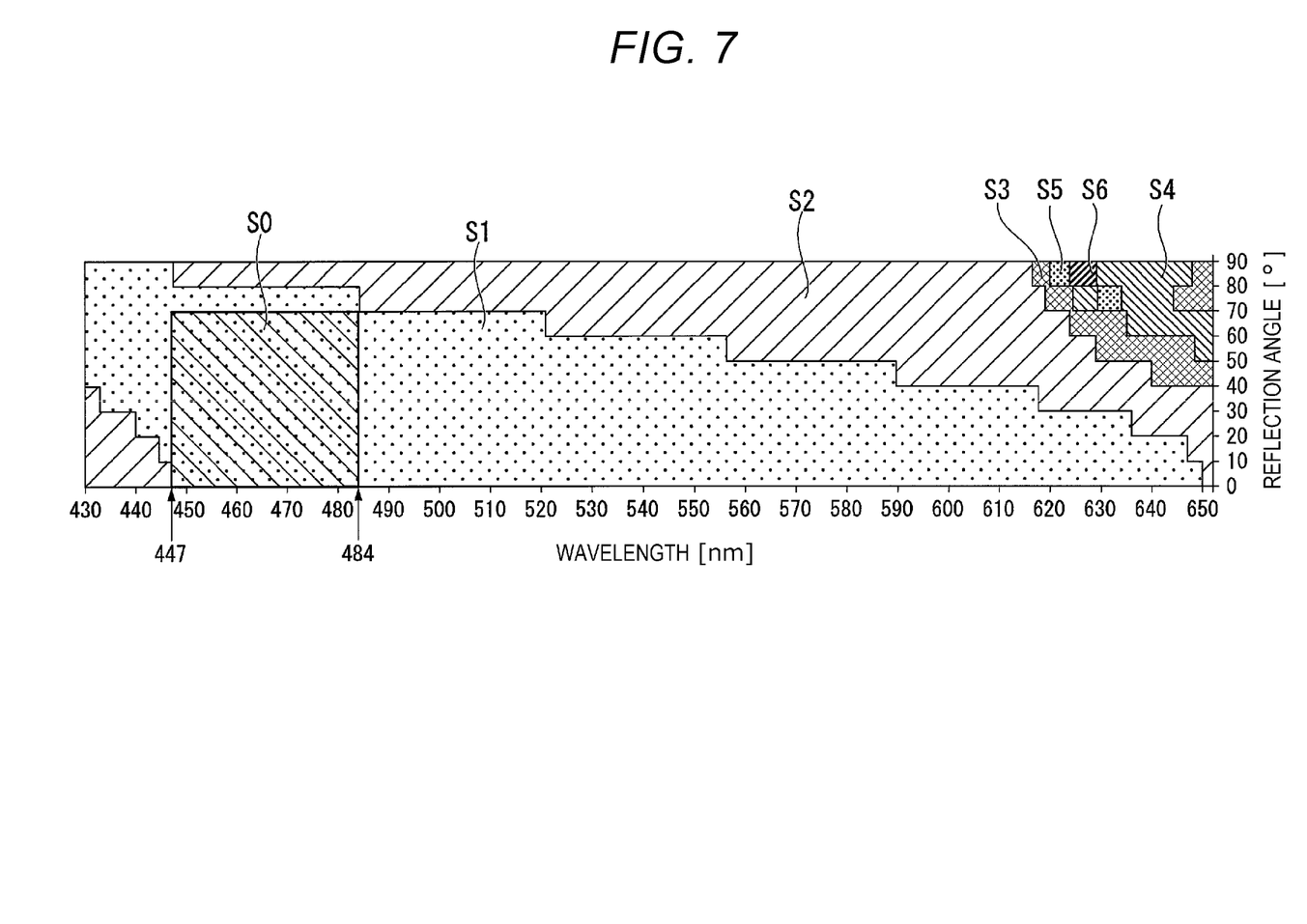
FIG. 7 is a view showing a reflectance difference between a diffusion plate of Example and a diffusion plate of Comparative Example.

FIG. 7 is a view showing a reflectance difference between the diffusion plate of Example and the diffusion plate of Comparative Example.

With respect to each of the diffusion plates, the reflectance was measured for each of the wavelength and the reflection angle, and a reflectance difference between the diffusion plate of Example and the diffusion plate of Comparative Example was calculated.

The reflectance (%) is defined by the following formula (1).

$$\text{reflectance (\%)} = (\text{amount of reflected light/amount of incident light}) \times 100 \quad (1)$$

The reflectance difference (RD) is defined by the following formula (2).

$$\text{RD (\%)} = [\text{reflectance (\%) of diffusion plate (Al reflection film) of Example}] - [\text{reflectance (\%) of diffusion plate (Ag reflection film) of Comparative Example}] \quad (2)$$

Here, the RD (%) was rounded after the decimal point and denoted by an integer.

In FIG. 7, the horizontal axis represents the wavelength [nm], and the vertical axis represents the reflection angle [°].

Further, in FIG. 7, the RD is shown by being divided into 6 ranks depending on the magnitude, and the ranges of RD (%) in the respective regions denoted by symbols S1 to S6 are as follows.

Region S1: $0 \leq \text{RD (\%)}$
Region S2: $-10 \leq \text{RD (\%)} < 0$
Region S3: $-20 \leq \text{RD (\%)} < -10$
Region S4: $-30 \leq \text{RD (\%)} < -20$
Region S5: $-40 \leq \text{RD (\%)} < -30$
Region S6: $-50 \leq \text{RD (\%)} < -40$ As shown in FIG. 7, it was found that with respect to the light having a wavelength band of 610 nm or more, the reflectance of the diffusion plate of Example significantly decreases as compared with the reflectance of the diffusion plate of Comparative Example. However, the diffusion plate of Example aims at diffusely reflecting blue light, and the decrease in the reflectance with respect to the light having a wavelength band of 610 nm or more is not particularly a problem.

In the meantime, with respect to the light having a wavelength band of less than 447 nm, the reflectance of the diffusion plate of Example is comparable to the reflectance of the diffusion plate of Comparative Example, or decreases by 10% at most as compared with the reflectance of the diffusion plate of Comparative Example in the region in which the reflection angle is from 0° to 70°. On the other hand, with respect to the light having a wavelength band of 447 nm or more and 484 nm or less, the reflectance of the diffusion plate of Example is comparable to the reflectance of the diffusion plate of Comparative Example particularly in the range denoted by the symbol S0 in which the reflection angle is from 0° to 70°.

In this manner, it was confirmed that the diffusion plate of Example using the Al reflection film has substantially the same reflectance as the diffusion plate of Comparative Example using the Ag reflection film with respect to the light having a wavelength band of 447 nm or more and 484 nm or less (the wavelength band is 37 nm or less). Further, it was confirmed that the diffusion plate of Example has substantially the same reflectance as the diffusion plate of Comparative Example in the range in which the reflection angle is from 0° to 70°. This characteristic can be achieved by the film configuration shown in Table 1, however, the film configuration is not limited to the values of the film thicknesses shown in Table 1, and the wavelength band in which a favorable reflectance is achieved can be appropriately adjusted by adjusting the film thicknesses of the respective layers. Therefore, by limiting the wavelength band of light to 37 nm or less, a favorable reflectance characteristic can be obtained with the same number of layers.

Evaluation of Reliability

The present inventors performed a reliability test with respect to the diffusion plates of Example.

The conditions for the reliability test were adjusted such that blue semiconductor laser light with a wavelength of 450 nm to 465 nm was irradiated onto each of the diffusion plates at a light quantity of 300 W and a light density of 75 W/mm$^2$, and constant heat was applied to the diffusion plate using a heater so that the initial temperature of the diffusion plate was 200° C., and a time until the reflection film was deteriorated was evaluated.

When the reflection film is deteriorated, the absorption ratio increases so that the temperature of the diffusion plate increases. The absorption ratio of the reflection film is low, and therefore, when the absorption ratio increases by only several percent due to deterioration of the reflection film, the energy absorbed by the reflection film increases to several times. In this reliability test, the increase in the temperature of the diffusion plate by light irradiation is 50° C. or more, and if the absorption ratio of the reflection film changes, an increase in temperature by 10° C. or more easily occurs. Therefore, a deterioration time until the temperature of the diffusion plate increases by 10° C. was measured. As for the conditions for this reliability test, the light density was set twice or more with respect to the condition for a commercially available projector product and the temperature was set to 50° C. or higher, and when reliability of 1000 hours or more is obtained, reliability of tens of thousands of hours as a product can be expected.

With respect to the diffusion plate of Example, two samples were experimentally prepared, and the deterioration time was measured. As a result, in one sample, deterioration was not confirmed even after 1000 hours passed, and in the other sample, deterioration was not confirmed even after 3900 hours passed. These deterioration times satisfied the acceptance criteria of reliability of 1000 hours or more, and it was found that the reliability was ensured.

As described above, according to the diffusion plate 305 of this embodiment, even if aluminum is used for the reflection film 307, the reliability of the reflection film 307 and the diffusion plate 305 can be enhanced while ensuring the same reflectance as in the case of using silver for the reflection film with respect to light having a wavelength band of 447 nm or more and 484 nm or less and a wavelength band of 37 nm or less.

Further, the reflection film 307 composed of high purity aluminum or superhigh purity aluminum can be formed by forming an aluminum film on the base material 301 by a sputtering method or a vapor deposition method. The reflection face formed of the reflection film 307 has an excellent reflection characteristic as compared with the reflection face composed of the surface of a mirror-finished aluminum alloy. Further, a method for collectively forming films by arranging the base materials 301 processed into an uneven structure side by side has excellent productivity as compared with a method for processing the surface of the base material into a mirror-finished state, and reduction in the production cost is achieved. Further, by selecting, as the material of the reflection film 307, an aluminum film in which the main component is substantially the same as that of the base material 301 composed of an aluminum alloy, the adhesion of the reflection film can be enhanced, and also a robust configuration in which generation of stress due to thermal expansion occurs less can be realized. Therefore, it is desired to adopt a combination such that the aluminum content of the reflection film is higher than the aluminum content of the base material by selecting aluminum having a high aluminum content that has a high reflectance and is excellent in film formation for the reflection film, and selecting an aluminum alloy that has excellent processability and rigidity for the base material.

In addition, in the diffusion plate 305 of this embodiment, the dielectric multilayer film 308 is provided on the upper side of the reflection film 307, and therefore, the reflectance of the reflection film 307 is further improved, and the effect of heat on the base material 301 can be reduced. As a result, stress due to thermal expansion is relaxed, and the diffusion plate 305 in which the reflection film 307 has high reliability can be obtained. Further, the dielectric multilayer film 308 not only functions as an enhanced reflection film, but also functions as a protective layer for the reflection film 307 and prevents the reflection film 307 from coming into contact with air. Therefore, deterioration of the reflection film 307 due to chemical change such as oxidation is suppressed, and also aggregation of aluminum or the like is suppressed.

In this manner, the light source device 2 according to this embodiment improves the reliability by including the diffusion plate 305 having high reliability.

Further, the projector 1 according to this embodiment improves the reliability by including the light source device 2 according to this embodiment.

The technical scope of the invention is not limited to the above-mentioned embodiments, and various changes can be added without departing from the gist of the invention.

For example, in the above-mentioned embodiments, a configuration in which the reflection film is directly provided on the uneven structure of the base material is shown, however, in place of this configuration, the reflection film may be provided on the uneven structure of the base material through a foundation film containing a metal such as nickel (Ni), chromium (Cr), or titanium (Ti).

The metal such as Ni, Cr, or Ti is known to have an effect of suppressing aggregation of a metal such as Al, and by using such a metal as a foundation film, alteration of the Al reflection film can be suppressed. Further, depending on the type of the Al alloy to become the base material, the metal such as Ni, Cr, or Ti may sometimes exhibit more favorable adhesion than pure Al, and in such a case, the adhesion of the reflection film can be enhanced. In order to adjust the adhesion or the stress balance with the dielectric multilayer film, a film composed of an oxide such as $Al_2O_3$ may be added to the foundation layer. By making the thickness of the entire foundation layer smaller than the thickness of the reflection film, a combination of the base material composed of an Al alloy and the reflection film composed of pure Al does not have a large influence on the effect of relaxing the difference in thermal expansion.

For example, in the above-mentioned embodiments, an Al alloy is used as the base material, however, another material may be used. Further, as the constituent element of the uneven structure of the reflection-type diffusion plate, a plurality of recess portions are used, however, a plurality of protrusion portions may be used.

In addition, the shape, number, arrangement, material, and the like of each of various constituent elements of the diffusion device, the light source device, and the projector are not limited to the above-mentioned embodiments, and can be appropriately modified.

In the above-mentioned embodiments, an example in which the diffusion device and the light source device according to the invention are mounted on a projector is shown, but the invention is not limited thereto. The diffusion device and the light source device according to the invention can also be applied to, for example, a lighting device, a headlight of a car, and the like.

The entire disclosure of Japanese Patent Application No. 2018-059135, filed on Mar. 27, 2018 is expressly incorporated by reference herein.

What is claimed is:

1. A light source device, comprising:
   a light source configured to emit blue light having a wavelength band of 37 nm or less; and
   a diffusion element configured to diffuse the light emitted from the light source; wherein
   the diffusion element includes
      a base material that has an uneven structure and is composed of a metal,
      a reflection film that is provided along the uneven structure and is composed of aluminum, and
      a dielectric multilayer film provided on the reflection film.

2. The light source device according to claim 1, wherein the base material is composed of an aluminum alloy, and the aluminum content of the reflection film is higher than the aluminum content of the base material.

3. The light source device according to claim 1, wherein the dielectric multilayer film is composed of two or more types of materials having mutually different refractive indices, and is constituted by a dielectric film having seven or more layers.

4. The light source device according to claim 1, wherein the reflection film reflects the light at a reflection angle within a range of 0° to 70° based on a direction perpendicular to a tangent line to the surface of the reflection film at an incident position of the light.

5. The light source device according to claim 2, wherein the reflection film reflects the light at a reflection angle within a range of 0° to 70° based on a direction perpendicular to a tangent line to the surface of the reflection film at an incident position of the light.

6. The light source device according to claim 1, wherein the wavelength of the light source is 447 nm or more and 484 nm or less.

7. The light source device according to claim 2, wherein the wavelength of the light source is 447 nm or more and 484 nm or less.

8. The light source device according to claim 3, wherein the wavelength of the light source is 447 nm or more and 484 nm or less.

9. The light source device according to claim 4, wherein the wavelength of the light source is 447 nm or more and 484 nm or less.

10. The light source device according to claim 1, further comprising a rotating device configured to rotate the diffusion element.

11. A projector, comprising:
    the light source device according to claim 1;
    a light modulator configured to modulate light emitted from the light source device in accordance with image information; and
    a projection optical device configured to project the light modulated by the light modulator.

12. A projector, comprising:
    the light source device according to claim 2;
    a light modulator configured to modulate light emitted from the light source device in accordance with image information; and
    a projection optical device configured to project the light modulated by the light modulator.

13. A projector, comprising:
    the light source device according to claim 3;
    a light modulator configured to modulate light emitted from the light source device in accordance with image information; and
    a projection optical device configured to project the light modulated by the light modulator.

14. A projector, comprising:
    the light source device according to claim 4;
    a light modulator configured to modulate light emitted from the light source device in accordance with image information; and
    a projection optical device configured to project the light modulated by the light modulator.

15. A projector, comprising:
    the light source device according to claim 5;
    a light modulator configured to modulate light emitted from the light source device in accordance with image information; and
    a projection optical device configured to project the light modulated by the light modulator.

16. A projector, comprising:
    the light source device according to claim 6;
    a light modulator configured to modulate light emitted from the light source device in accordance with image information; and
    a projection optical device configured to project the light modulated by the light modulator.

17. A projector, comprising:
    the light source device according to claim 7;
    a light modulator configured to modulate light emitted from the light source device in accordance with image information; and
    a projection optical device configured to project the light modulated by the light modulator.

18. A projector, comprising:
    the light source device according to claim 8;
    a light modulator configured to modulate light emitted from the light source device in accordance with image information; and a projection optical device configured to project the light modulated by the light modulator.

19. A projector, comprising:
the light source device according to claim 9;
a light modulator configured to modulate light emitted from the light source device in accordance with image information; and
a projection optical device configured to project the light modulated by the light modulator.

20. A projector, comprising:
the light source device according to claim 10;
a light modulator configured to modulate light emitted from the light source device in accordance with image information; and
a projection optical device configured to project the light modulated by the light modulator.

\* \* \* \* \*